US011238662B2

(12) United States Patent
Habel et al.

(10) Patent No.: US 11,238,662 B2
(45) Date of Patent: Feb. 1, 2022

(54) OPTIMAL LUMINANCE MAPPING FOR AUGMENTED REALITY DEVICES

(71) Applicant: Apple Inc., Cupertino, CA (US)

(72) Inventors: Ralf Habel, Cupertino, CA (US); Anselm Grundhoefer, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/018,059

(22) Filed: Sep. 11, 2020

(65) Prior Publication Data

US 2021/0090342 A1    Mar. 25, 2021

Related U.S. Application Data

(60) Provisional application No. 62/905,509, filed on Sep. 25, 2019.

(51) Int. Cl.
*G06T 19/00* (2011.01)
*G02B 27/01* (2006.01)
*H04N 5/235* (2006.01)

(52) U.S. Cl.
CPC ........ *G06T 19/006* (2013.01); *G02B 27/0172* (2013.01); *H04N 5/2351* (2013.01); *G02B 2027/0138* (2013.01)

(58) Field of Classification Search
None
See application file for complete search history.

(56) References Cited

U.S. PATENT DOCUMENTS

| 7,489,420 B2 * | 2/2009 | Bezryadin | H04N 1/6058 |
| | | | 345/428 |
| 9,097,891 B2 * | 8/2015 | Border | G02B 27/017 |
| 9,519,149 B2 | 12/2016 | Lee | |
| 9,799,256 B2 * | 10/2017 | Yoshiyama | G09G 3/3208 |
| 10,198,868 B2 | 2/2019 | Yamaguchi | |
| 10,725,299 B2 * | 7/2020 | Patel | G09G 5/006 |

(Continued)

FOREIGN PATENT DOCUMENTS

| CN | 107564470 | 1/2018 |
| JP | 2018-503198 A | 2/2018 |
| KR | 10-2019-0027131 A | 3/2019 |

OTHER PUBLICATIONS

Mori, Shohei, et al. "Brightview: Increasing perceived brightness of optical see-through head-mounted displays through unnoticeable incident light reduction." 2018 IEEE Conference on Virtual Reality and 3D User Interfaces (VR). IEEE, 2018. (Year: 2018).*

(Continued)

*Primary Examiner* — Ryan M Gray
(74) *Attorney, Agent, or Firm* — Thompson Hine LLP (57) ABSTRACT

Various implementations disclosed herein adjust the luminance values of an image to improve the appearance of the image on an augmented reality device. In some implementations, the luminance values of an image are adjusted so that the image can be displayed on an augmented reality device (e.g., with background luminance) such that the image will be perceived more similarly to how the image would be perceived otherwise (e.g., on a device without background luminance). In some implementations, an image is adjusted based on an estimate of human perception of luminance that is not linear.

20 Claims, 8 Drawing Sheets

(56) References Cited

U.S. PATENT DOCUMENTS

| | | | |
|---|---|---|---|
| 2014/0253605 A1* | 9/2014 | Border | G02B 27/017 |
| | | | 345/690 |
| 2015/0235583 A1* | 8/2015 | Schowengerdt | G02B 27/0093 |
| | | | 345/690 |
| 2017/0090194 A1 | 3/2017 | Hayes | |

OTHER PUBLICATIONS

Korean Intellectual Property Office, Notice of Preliminary Rejection (with English translation), Korean Patent Application No. 10-2020-0123799, 9 pages, dated Jun. 28, 2021.

* cited by examiner

OPTIMAL LUMINANCE MAPPING FOR AUGMENTED REALITY DEVICES

CROSS-REFERENCE TO RELATED APPLICATIONS

This application claims the benefit of U.S. Provisional Application Ser. No. 62/905,509 filed Sep. 25, 2019, which is incorporated herein in its entirety.

TECHNICAL FIELD

The present disclosure generally relates to displaying content on electronic devices and, in particular, to systems, methods, and devices for adjusting images displayed on augmented reality (AR) devices to account for the background physical environment and human perception.

BACKGROUND

Existing systems that provide content on augmented reality devices may not adequately account for the background physical environment or human perception.

SUMMARY

Systems that provide content on electronic devices may be configured to present augmented reality (AR) environments. For example, an electronic system for presenting a CGR environment may have a display that enables a person to view a physical environment. The system may be configured to present images on a display, so that a person, using the system, perceives the content of the images superimposed over the physical environment. Images may be displayed on a background that includes light from the physical environment. This background may change how a person perceives the image content so that the content may be perceived differently than the content would be perceived on a device that has no such background. For example, the background luminance of the physical environment may combine with the luminance of a displayed image to alter the appearance of the displayed content. Moreover, simply shifting the luminance values of the content to account for the background may not sufficiently adjust the appearance since doing so may not account for human perception. For example, human perception of lightness may not be linearly correlated with changes in luminance.

Implementations disclosed herein adjust the luminance values of an image to improve the appearance of the image on an augmented reality device. In some implementations, the luminance values of an image are adjusted so that the image can be displayed on an augmented reality device (e.g., with background luminance) such that the image will be perceived more similarly to how the image would be perceived otherwise (e.g., on a device without background luminance). In some implementations, an image is adjusted based on an estimate of human perception of luminance that is not linear.

Some implementations disclosed herein provide a method performed at an electronic device having a processor. The method involves identifying first luminance values corresponding to pixels of an image. The method determines second luminance values corresponding to the pixels of the image adjusted for display on an augmented reality device. The second luminance values are determined based on the first luminance values, a non-linear relationship between luminance and perception (e.g., a luminance-to-lightness curve), and a third luminance associated with a physical environment (e.g., an estimate of background luminance). The method displays the image using the second luminance values on the augmented reality device. For example, the augmented reality device may be configured to provide a view comprising the image and the physical environment, e.g., the image may be displayed in front of a view of the physical environment. The adjustment of the luminance values may provide an image that is perceived to be more similar to an intended appearance.

In some implementations, the luminance values are adjusted using human perceptual values. For example, this may involve determining first perceptual values (e.g., lightness values) based on the first luminance values and the non-linear relationship between luminance and perception (e.g., based on a luminance-to-lightness curve). Second perceptual values (e.g., adjusted lightness values) corresponding to the pixels of the image may be determined by adjusting the first perceptual values based on a characteristic of the physical environment. For example, a range of the lightness values and thus all of the first perceptual values may be adjusted to account for the background luminance of the physical environment, e.g., by increasing each of the first perceptual values by adding a value corresponding to a background luminance of the physical environment. The perceptual values may be adjusted linearly, e.g., adding the same amount to each perceptual value. The second (e.g., adjusted) perceptual values may be used to determine the second (e.g., adjusted) luminance values based on the non-linear relationship between luminance and perception. The resulting luminance values may more accurately represent luminance differences intended for the content based on how humans perceive luminance differences than luminance values otherwise adjusted.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
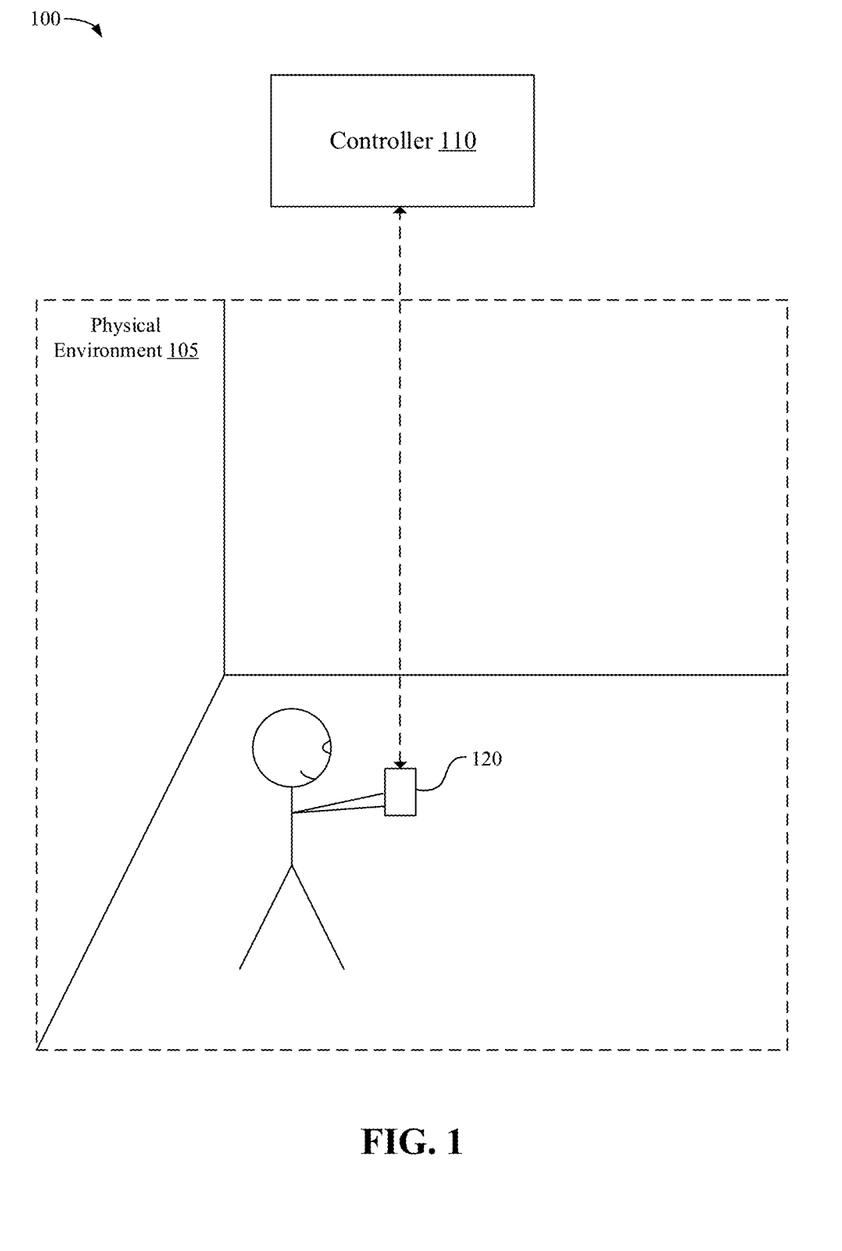
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a device 120.

In some implementations, the controller 110 is configured to manage and coordinate an experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the device 120 via one or more wired or wireless communication channels 144 (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the controller 110 are provided by and/or combined with the device 120.

According to some implementations, the device 120 presents a computer-generated reality (CGR) environment to the user while the user is in the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted devices (HMDs), projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. An HMD may have one or more speaker(s) and one or more display(s). An HMD may incorporate one or more imaging sensors to capture images or video of the physical environment, and/or one or more microphones to capture audio of the physical environment. An HMD may have one or more transparent or translucent displays. The transparent or translucent displays may have a medium through which light representative of images is directed to a person's eyes. The displays may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, a transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the user wears the device 120 on his/her head. The device 120 may include one or more displays provided to display content. For example, the device 120 may enclose the field-of-view of the user. In some implementations, the device 120 is a handheld electronic device (e.g., a smartphone or a tablet) configured to present content to the user. In some implementations, the device 120 is replaced with a chamber, enclosure, or room configured to present content in which the user does not wear or hold the device 120.

Figure 2:
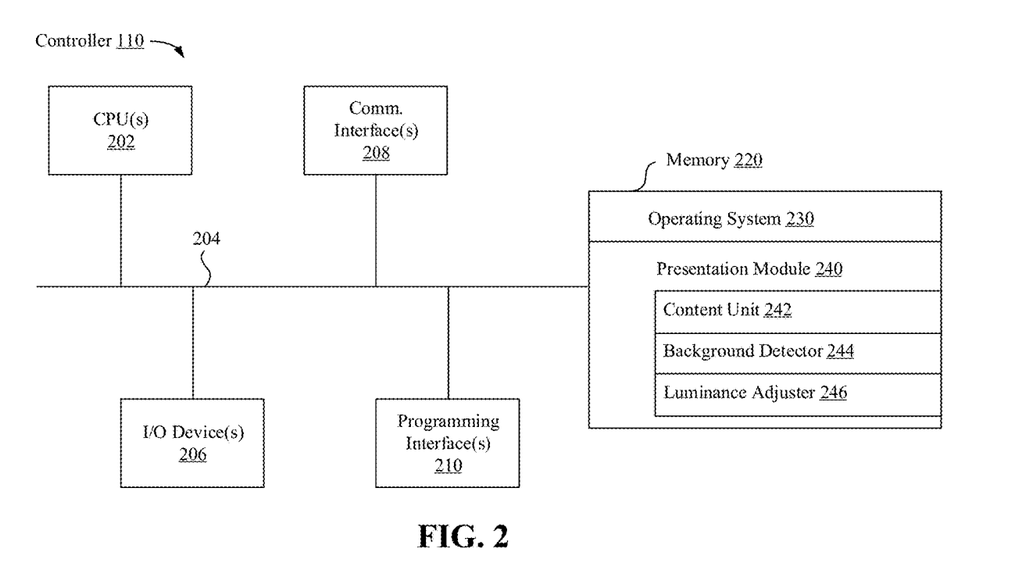
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and presentation module 240.

The operating system 230 includes procedures for handling various basic system services and for performing hardware dependent tasks.

In some implementations, the presentation module 240 is configured to manage and coordinate one or more experiences for one or more users (e.g., a single experience for one or more users, or multiple experiences for respective groups of one or more users). To that end, in various implementations, the presentation module 240 includes a content unit 242, a background detector 244, and a luminance adjuster 246.

In some implementations, the content unit 242 is configured to provide an image or other image-based content for presentation. In some implementations, a 3D model of a real or virtual environment is maintained and used to render content. The content may be generated and stored locally or received from an external source. To that end, in various implementations, the content unit 242 includes instructions and/or logic therefor, configured neural networks, and heuristics and metadata therefor.

In some implementations, the background detector 244 is configured to detect one or more characteristics of the physical environment. For example, the background detector 244 may receive data from a sensor in the physical environment and use the data to determine a background level of luminance in the physical environment. To that end, in various implementations, the background detector 244 includes instructions and/or logic therefor, and heuristics and metadata therefor.

In some implementations, the luminance adjuster 246 is configured to adjust luminance values of one or more pixels of images or image content provided by content unit 242. For example, the luminance adjuster may perform a method according to various implementations disclosed herein to determine luminance adjustments that account for the physical environment (e.g., the background luminance of an augmented reality device determined by background detector 244) and/or human perception (e.g., taking into account a luminance-to-lightness curve). To that end, in various implementations, the luminance adjuster 246 includes instructions and/or logic therefor, and heuristics and metadata therefor.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
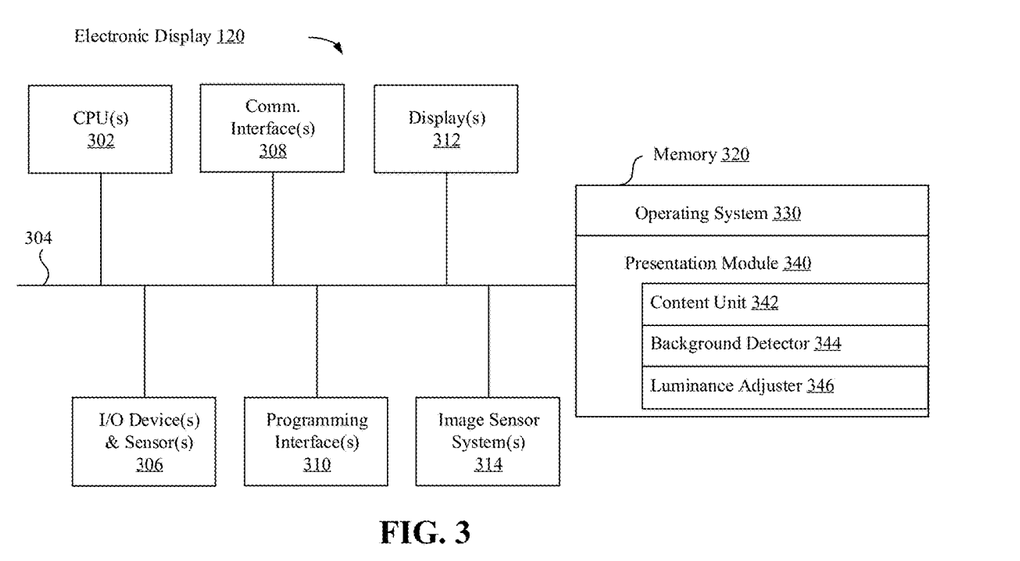
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and presentation module 340.

The operating system 330 includes procedures for handling various basic system services and for performing hardware dependent tasks.

In some implementations, the presentation module 340 is configured to manage and coordinate one or more experiences for one or more users (e.g., a single experience for one or more users, or multiple experiences for respective groups of one or more users). To that end, in various implementations, the presentation module 340 includes a content unit 342, a background detector 344, and a luminance adjuster 346.

In some implementations, the content unit 342 is configured to provide an image or other image-based content for presentation. In some implementations, a 3D model of a real or virtual environment is maintained and used to render content. The content may be generated and stored locally or received from an external source. To that end, in various implementations, the content unit 342 includes instructions and/or logic therefor, configured neural networks, and heuristics and metadata therefor.

In some implementations, the background detector 344 is configured to detect one or more characteristics of the physical environment. For example, the background detector 344 may receive data from a sensor in the physical environment and use the data to determine a background level of luminance in the physical environment. To that end, in various implementations, the background detector 344 includes instructions and/or logic therefor, and heuristics and metadata therefor.

In some implementations, the luminance adjuster 346 is configured to adjust luminance values of one or more pixels of images or image content provided by content unit 342. For example, the luminance adjuster may perform a method according to various implementations disclosed herein to determine luminance adjustments that account for the physical environment (e.g., the background luminance of an augmented reality device determined by background detector 344) and/or human perception (e.g., taking into account a luminance-to-lightness curve). To that end, in various implementations, the luminance adjuster 346 includes instructions and/or logic therefor, and heuristics and metadata therefor.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Exemplary Methods of Displaying an Image

Implementations disclosed herein adjust the luminance values of an image to improve the appearance of the image on augmented reality device. The augmented reality device, in one example, is an optical see-through device. In some implementations, the luminance values of an image are adjusted so that the image can be displayed on the device (e.g., with background luminance) such that the image will be perceived more similarly to how the image would be perceived otherwise (e.g., on a device with little or no background luminance). In some implementations, an image is adjusted based on an estimate of human perception of luminance that is not linear.

Figure 4:
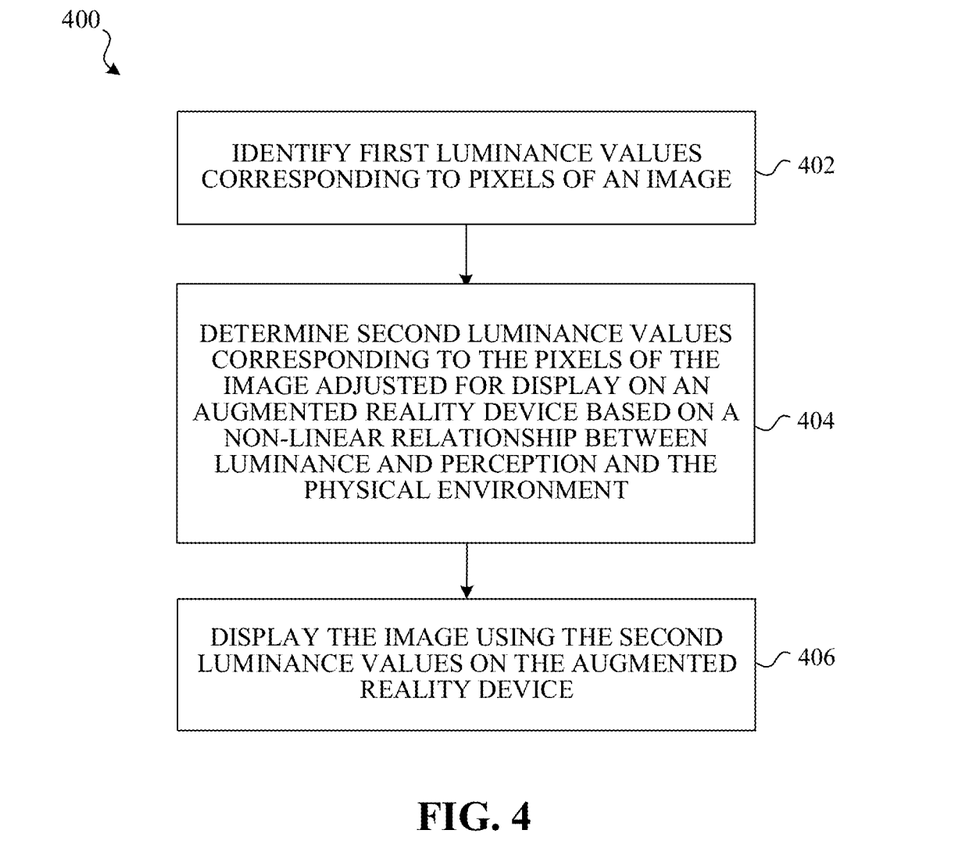
FIG. 4 is a flowchart representation of an exemplary method of displaying an image using luminance values adjusted for display on an augmented reality device.

FIG. 4 is a flowchart representation of an exemplary method 400 of displaying an image using luminance values adjusted for display on an augmented reality device. In some implementations, the method 400 is performed by a device (e.g., controller 110 of FIGS. 1 and 2), such as a mobile device, desktop, laptop, or server device. The method 400 can be performed on an augmented reality device itself (e.g., device 120 of FIGS. 1 and 3). The device may be a head-mounted device (HMD) and may be an optical see-through device. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 402, the method 400 identifies first luminance values corresponding to pixels of an image. In some implementations, each pixel of an image has a defined luminance according to a color scheme that is used to define the image. In other implementations, a luminance for each pixel is determined by interpreted color values that define the appearance of each pixel according to a color scheme. In some implementations, the image comprises a view of a virtual content that is to be displayed on an augmented reality device in front of a physical environment. The image may include content that has an intended appearance that assumes zero background luminance, e.g., the first luminance values may be pixel luminance values of an image having an appearance that was originally created for or otherwise appropriate for display on a different device without background luminance.

At block 404, the method 400 determines second luminance values corresponding to the pixels of the image adjusted for display on an augmented reality device based on a non-linear relationship between luminance and perception (e.g., a luminance-to-lightness curve) and a third luminance associated with a physical environment (e.g., background luminance). The first luminance values may be pixel-specific luminance values of an image intended for display on a device without background luminance. The non-linear relationship may correspond to a non-linear luminance-to-lightness curve.

Figure 5:
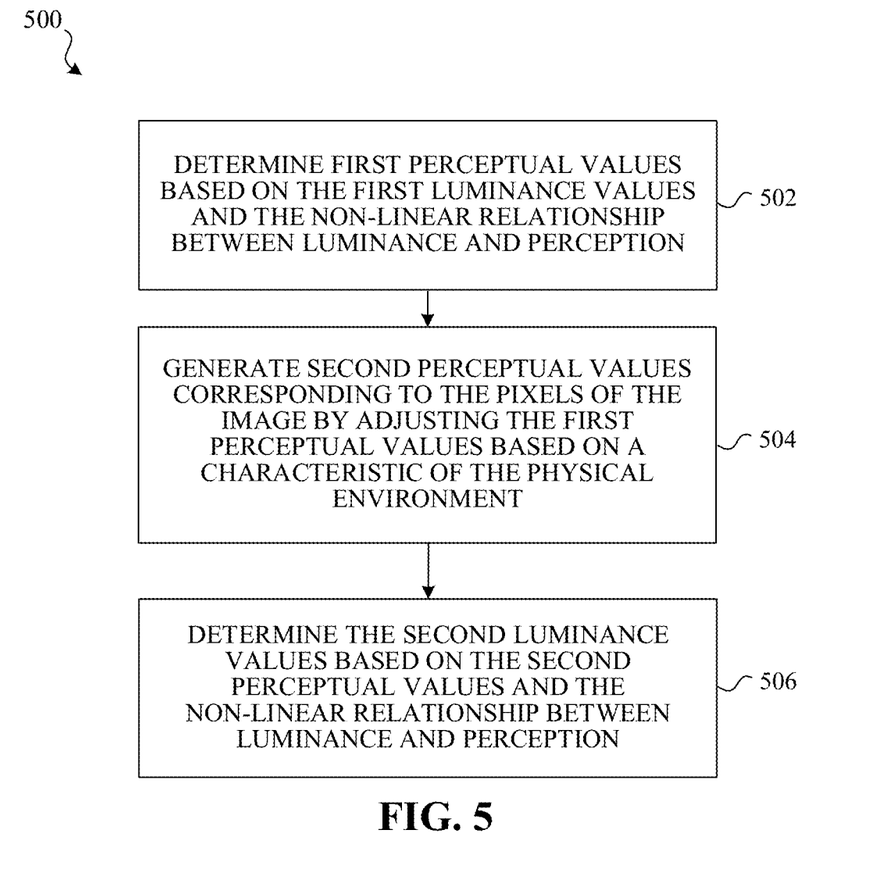
FIG. 5 is a flowchart representation of an exemplary method of adjusting luminance values of an image for display on an augmented reality device.

FIG. 5 is a flowchart representation of an exemplary method 500 of adjusting luminance values of an image for display on an augmented reality device. At block 502, the method 500 determines first perceptual values (e.g., lightness values) based on the first luminance values and the non-linear relationship between luminance and perception (e.g., based on a luminance-to-lightness curve). For example, this may involve determining a perceptual value corresponding to each luminance value of each pixel of the image according to a luminance-to-lightness curve that defines such relationships. The luminance-to-lightness curve may have been determined based on scientific evaluation of the human population and/or the particular user involved in the experience.

At block 504, the method 500 generates second perceptual values (e.g., adjusted lightness values) corresponding to the pixels of the image by adjusting the first perceptual values based on a characteristic of the physical environment. For example, this may involve adjusting the range of the lightness values to account for the background luminance of the physical environment. In some implementations, the perceptual values are lightness values corresponding to differences in perceived light intensity contrast. The second perceptual values may be generated by adjusting the first perceptual values to account for a background luminance of the physical environment. The second perceptual values may be generated by increasing each of the first perceptual values by adding a value corresponding to a background luminance of the physical environment.

At block 506, the method 500 determines the second luminance values based on the second perceptual values and the non-linear relationship between luminance and perception. For example, this may involve determining a luminance value corresponding to each second perceptual value for each pixel of the image according to a luminance-to-lightness curve that defines such relationships.

The second luminance values may be further adjusted (e.g., reduced) to account for the background luminance of the physical environment.

Returning to FIG. 4, after determining the second luminance values, at block 406, the method 400 displays the image using the second luminance values on the augmented reality device. For example, the device may be configured to provide a view comprising the image and the physical environment, e.g., the image is displayed in front of an optical-see-through view of the physical environment. The image may be displayed in front of a view of the physical environment on the device. Some or all of the pixels of the image may be presented on an optical see-through portion of the display such that the luminance that the viewer sees of each pixel is a combination of the displayed luminance of the pixel and the background luminance behind the pixel that is seen through the pixel.

Exemplary Techniques for Accounting for Human Perception

In some computer-generated reality (CGR), the additive nature of displayed content (e.g., augmentations) may pose a significant challenge. Little or none of the background physical environment that the displayed content is displayed in front of may be removed and thus may add luminance that interferes with the perception of the content displayed thereon. The lowest intensity color in displayed content may be the color of a wall of other objects in front of which the displayed content is displayed. Thus, the black point may not be a zero or any other very low intensity color as in the case of non-see-through displays and, instead, may be a potentially very high intensity background color. Implementations disclosed herein address this and other issues by optimizing or otherwise adjusting displayed content using the physical environment and human perception as guides.

Some implementations disclosed herein perform luminance mapping that compensates for human perceptual shifts occurring due to the additive nature of some displays. In some implementations, this is done using greyscale images without any chromatic contributions and the luminance of a background of the physical environment. In order to sense a background luminance, a camera or other sensor may be used to record the background and set the parameters for the luminance mapping.

Perceptual Uniform Color Spaces

Many perceptual uniform color spaces (UCS) are available. For example, a commonly used color space is the CIE L*a*b* (abbreviated as Lab) color space. Other perceptual color spaces include, but are not limited to, CIE CAM02 UCS, CIE CAM16 UCS, IPT, IctCp, UCS, RLab, LLab, and the Hunt Model. A goal of perceptual uniform color spaces may be to linearize human perception so that distances in those spaces correspond to the perceived differences in colors. In order to avoid a re-definition of the Lab color space, several modified distance metrics have been developed to alleviate shortcomings of the original Lab space which effectively define modified Lab UCS spaces. In addition, $J_z a_z b_z$ is a revised UCS that has been proposed that builds upon previous properties of other UCS (CIE CAM16 UCS and ICtCp). Jab explicitly models high-dynamic range and wide gamuts. In contrast to many other perceptual color spaces, $J_z a_z b_z$ is defined in relation to absolute luminance values (cd/m$^2$). UCS color spaces separate components into one lightness (or related measure) axis and two chroma (or related measure) axis. The chroma axis usually are defined along the yellow-blue and the red-green components of colors.

In the following examples, the $J_z a_z b_z$ color space is used. It will be appreciated that alternative implementations are possible using the techniques disclosed herein using existing and future color spaces.

Luminance and Lightness in UCS Color Spaces

As used herein "lightness" refers to a measure of perceived intensity of a color. Human perception of lightness may be non-linear, for example, roughly following a square root form. At low intensities, very small luminance differences may be perceived and the ability to differentiate luminance levels may diminish for larger luminance values, e.g., it may be easier for a human to distinguish between luminance levels 1 and 2 than from luminance levels 101 and 102.

Figure 6:
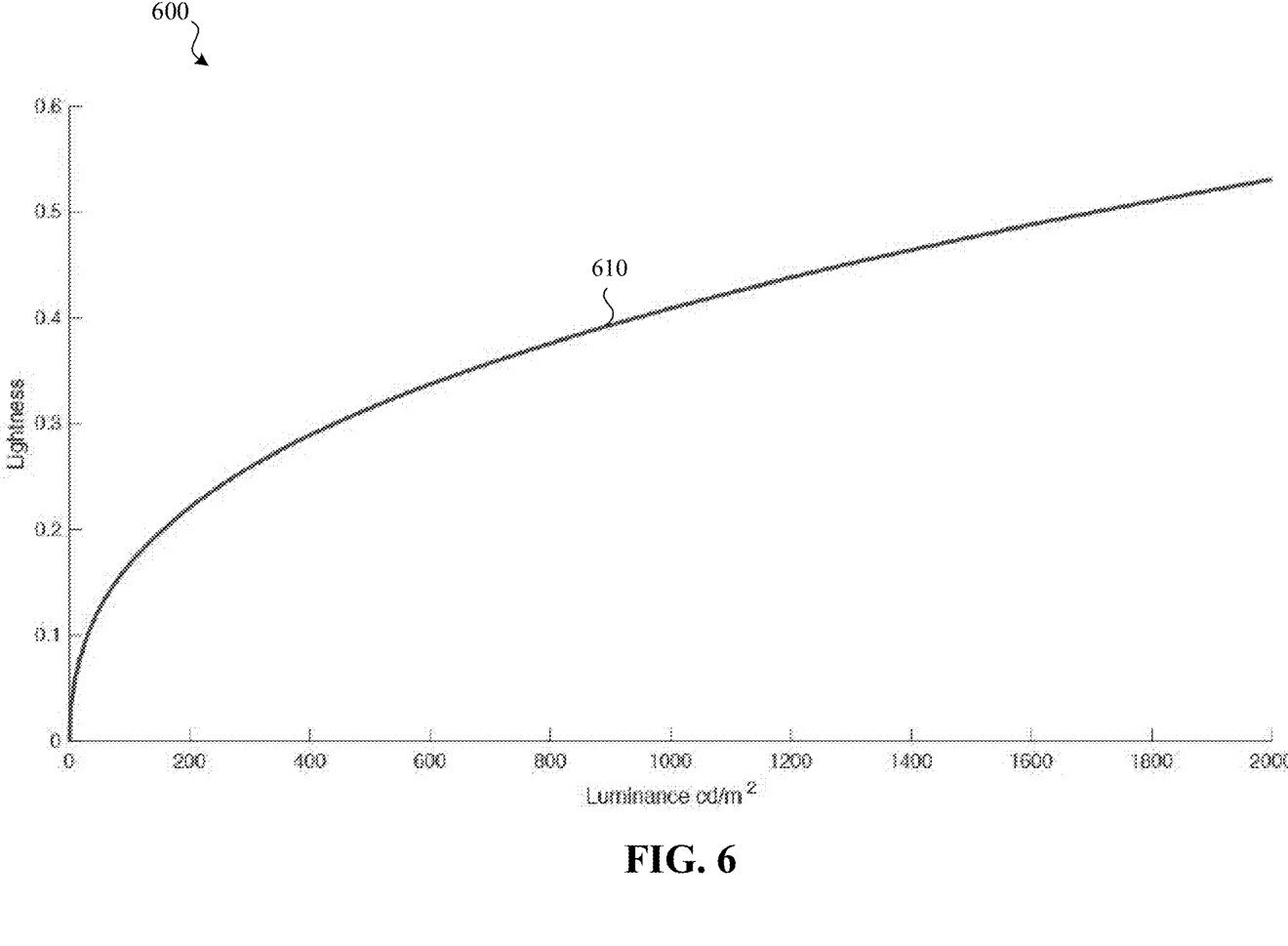
FIG. 6 is a chart illustrating an exemplary relationship between luminance and lightness.

FIG. 6 is a chart illustrating an exemplary relationship between luminance and lightness. Specifically, FIG. 6 illustrates a luminance-to-lightness mapping curve 600 as defined in the $J_z a_z b_z$ color space. Here, the mapping of the luminance-to-lightness mapping curve 600 is defined as J(L), where J is the lightness in the range of 0 to 1 (up to 0.6 depicted in FIG. 6) and L is the luminance in the range 0 to 10,000 (up to 2000 depicted in FIG. 6) as defined by the $J_z a_z b_z$ color space. Its inverse $L(J)=(J(L))^{-1}$ is defined respectively.

Lightness Mapping in Gamut Mapping

As used herein the phrase "gamut" is used to refer to the colors that a given device is capable of producing. Since human perception may be trichromatic, a gamut may be defined as a volume in a three-dimensional color space. Due to differences between the different color spaces, the form of the gamut in a particular space may be complex.

Gamut mapping is the process of mapping the gamut of one device into that of another to be able to reproduce the content of a device on another. The lightness range of a source gamut may be linearly mapped into the lightness range of a target gamut. This has the result that the relative lightness differences do not perceptually change, only the range as a whole changes and the lightness differences either increase or decrease isotropically over the whole range. This can be formulated:

$$J_t = M(J_s) = \frac{J_s - J_{s,max}}{J_{s,max} - J_{s,min}}(J_{t,max} - J_{t,min}) + J_{t,min}$$

where $J_t$ is the target lightness, $J_s$ is the source lightness and the min/max are the respective minimal and maximal values of the lightness ranges of the source and target gamuts. This operation may be labelled $M(J_s)$.

Exemplary Display of a CGR Environment on a Device

Figure 7:
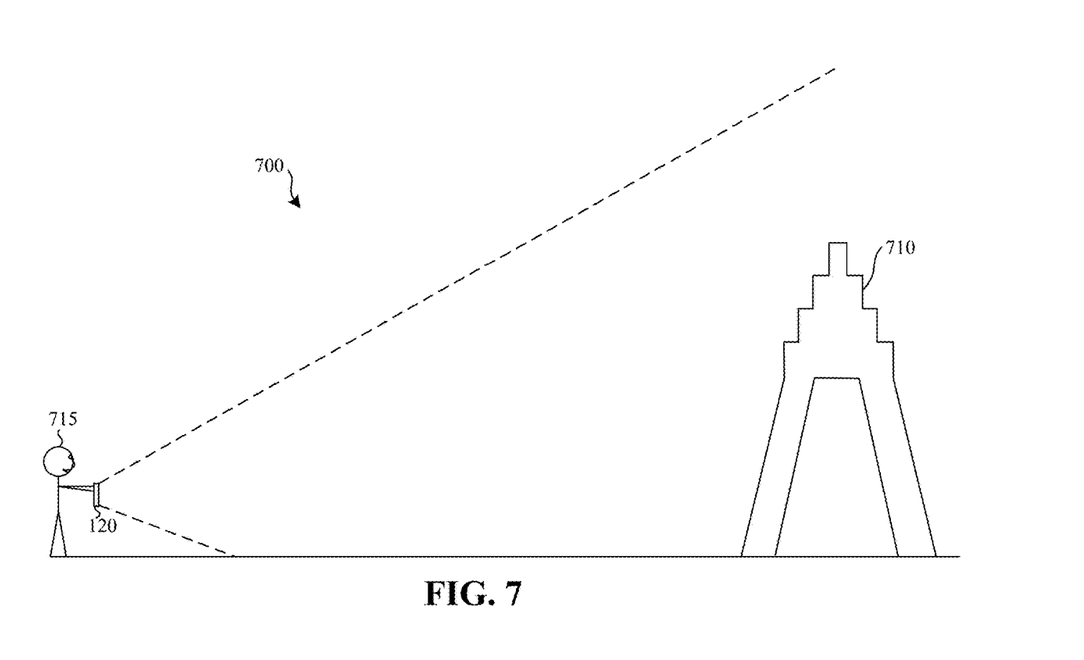
FIG. 7 is a block diagram illustrating an augmented reality device providing a view of a computer-generated reality (CGR) environment.
Figure 8:
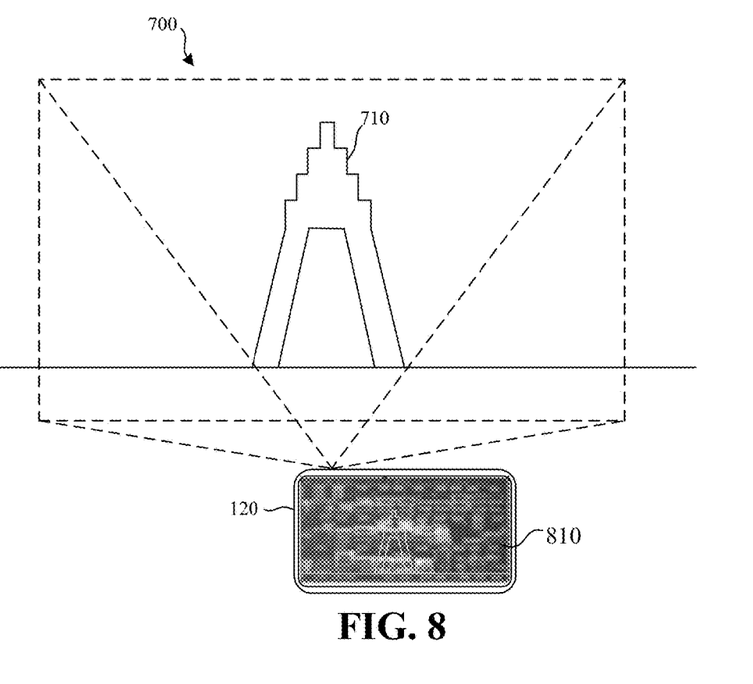
FIG. 8 is a block diagram illustrating another view of the device of FIG. 8 providing the CGR environment.

FIGS. 7 and 8 illustrate a device providing a view of a computer-generated reality (CGR) environment. In this example, the user 715 uses device 120 to view a CGR environment. The CGR environment includes a background for example based on a camera on device 120 capturing images that include object 710 and other background objects. An image 810 is displayed in front of a see-through view of this background on the device 120. Because of the background luminance of the physical environment, the image may not be perceived with its intended appearance unless adjusted according to techniques disclosed herein.

Luminance Mapping

For some devices, such as the device 120 of FIGS. 1, 3, 7 and 8, a reference/source display and corresponding gamut may be defined, along with luminance and related lightness ranges, by assuming the display of the image content on a pure black background. This may correspond to a standard display and may have a defined maximum luminance $L_{s,max}$ and a zero valued black point.

Figure 9:
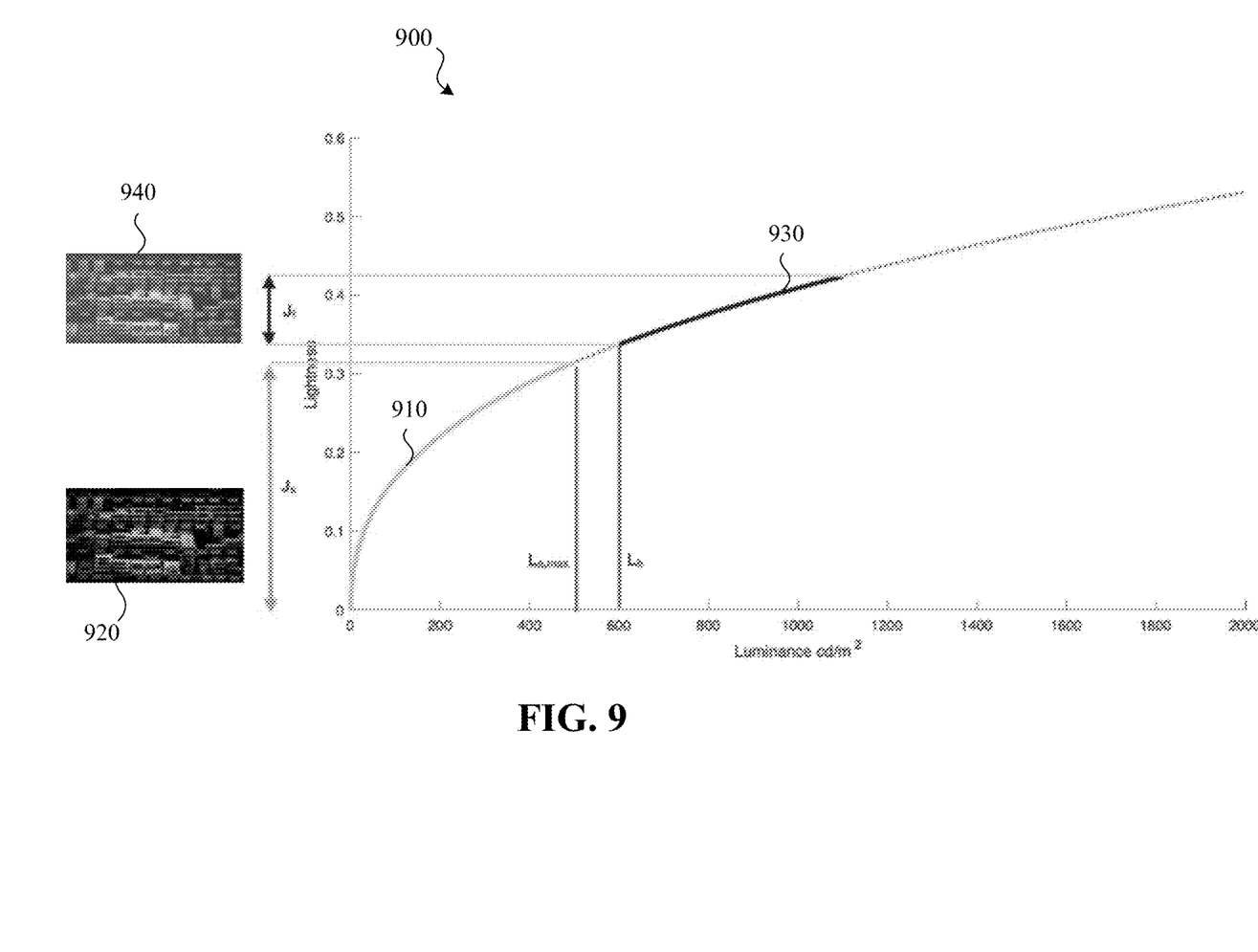
FIG. 9 is a block diagram illustrating the effect of background luminance on the perception of an image.

FIG. 9 is a block diagram illustrating the effect of background luminance on the perception.

In this example, the portion of the curve 910 corresponds to the reference luminance and lightness range of displaying content on a black background. Content 920 illustrates the perceived appearance of the image on a black background. The exemplary luminance range of 0 to 500 cd/m² is used for illustrative purposes, but may differ depending upon the implementation.

The portion of the curve 930 corresponds to displaying the content on a background with 600 cd/m² background luminance, resulting in a luminance range of 600 to 1100 cd/m², e.g., displaying the same image in front on a see-through device with a view of the physical environment. Content 940 illustrates the perceived appearance of the image on the background of a physical environment.

The reference display (e.g., content 920) defined assuming a pure black background may be used to define source values for the variables to be used in the above formulation. In some implementations, an augmentation or other display content added to a non-black background luminance $L_b$ is defined as the target gamut with a corresponding lightness/luminance range. Since the luminance range (as opposed to the lightness range) is additive, $J_{t,min}=J(L_b)$ is defined by the background luminance $L_b$ and the maximum is defined as $J_{t,max}=J(L_b+L_{s,max})$. FIG. 9 illustrates the ranges of the augmentation or other display content on a non-black background with an example $L_b$=600 cd/m².

While the maximum luminance $L_{s,max}$ may not change for a given device, the background luminance $L_b$ can change rapidly and constantly and is therefore a varying input in the technique.

Luminance Mapping Algorithm

In some implementations, a luminance mapping algorithm uses a luminance-to-lightness relationship (e.g., the J equation discussed above) to adjust luminance values. In some implementations, the following luminance mapping algorithm may be used: (1) calculate pixel luminance; (2) transform the luminance values into lightness values using the luminance-to-lightness curve; (3) map the lightness values to a target range; (4) transform the lightness values back to luminance values; and (5) further adjust the luminance values to remove the added background luminance.

In step 1, in order to reproduce the luminance differences of a given image on the reference/source display with a black background, the algorithm first calculates the luminance that each pixel produces. This may be a device dependent operation that may depend on the maximum luminance and the transfer characteristics of the device's display. In some implementations, a device display characteristic adheres to a standard color space definition. In such implementations, this operation may be to linearize the given value by applying a transfer function of the corresponding color space (e.g., the gamma curve) to arrive at the source luminance $L_s$. In some implementations, a device display characteristic adheres to the srgb color space definition. In such implementations, this operation may be to linearize the given value by exponentiation with 2.2 and multiplying the result with the maximum luminance of the display to arrive at the source luminances $L_s$.

In step 2, the algorithm transforms the luminance values into their corresponding lightness values, $J_s$, using the luminance to lightness curve $J(L)$.

In step 3, the algorithm maps the lightness values $J_s$ into the range of the target range $J_{t,min}$ to $J_{t,max}$ as defined by the background luminance $L_b$ using the equation below to determine the $J_t=M(J_s)$ values.

$$J_t = M(J_s) = \frac{J_s - J_{s,max}}{J_{s,max} - J_{s,min}}(J_{t,max} - J_{t,min}) + J_{t,min}$$

In step 4, to arrive at the mapped values, the algorithm transforms the $J_t$ values back into luminances $L_t$ using $L(J_t)$.

In step 5, the algorithm subtracts $L_b$ to prepare the values for the back transformation into the native space of the display. In the case of a display adhering to a standard color space, this may involve dividing the maximum luminance and reversing the transfer function of the corresponding color space. In the case of a display with srgb characteristics, for example, this may involve dividing by the maximum display luminance and exponentiating with 1/2.2.

Direct Luminance Mapping

The above exemplary algorithm contains offsetting luminances and transforming into the $J_z a_z b_z$ color space. In some implementations, the luminance mapping may be precomputed (e.g., prior to display of images), avoiding an explicit color space transformation. The mapping of the content into luminances may be device dependent and may need to be done per device. In some implementations, a luminance-driven display is assumed and the reference/source luminances are mapped to the target luminances independently of the display characteristics.

$Lt=L(M(J(L_s))-L_b$

Where the display luminances are fixed, the sole varying parameter may be the background luminance $L_b$. The luminance mapping for any given/potential background luminance $L_b$ may be precomputed. The above equation shows the formal mapping of a source luminance $L_s$ to its target luminance $L_t$. Note that the min and max values for M(J) are dependent on $L_b$.

Figure 10:
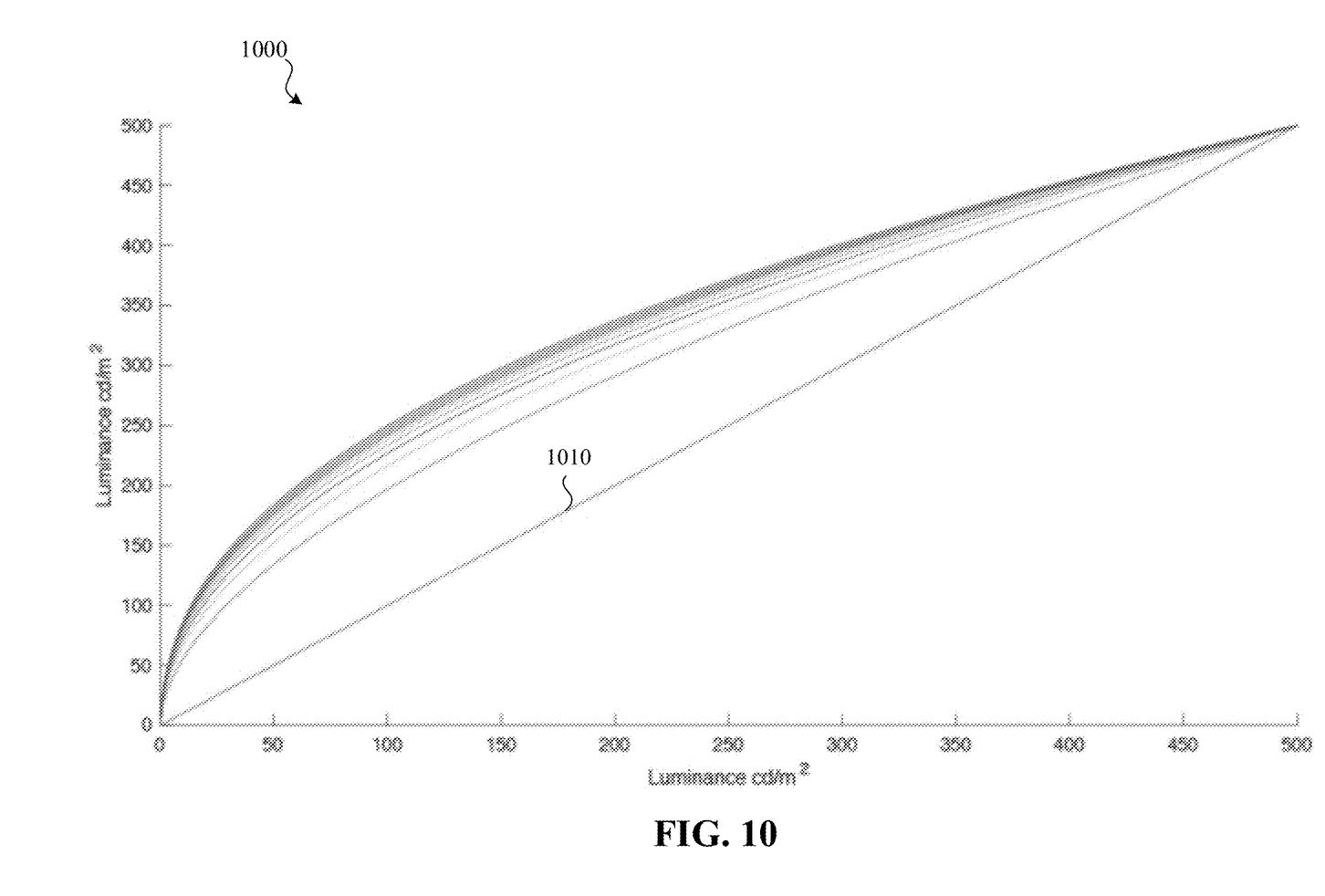
FIG. 10 is a chart illustrating a luminance mapping with increasing background luminance.

FIG. 10 is a chart 1000 shows the luminance mapping with increasing background luminance $L_b$. The line 1010 shows the identity mapping for $L_b$=0. The mapping is similar to a gamma curve with increasing exponent. This is likely because human perception may become more linear with higher background luminance. Also, due to human perception becoming linear, the mapping converges to a limit curve, showing little variation for high background luminances $L_b$.

Sensor Input From Camera

In order to properly use the described model together with a device's display, implementations disclosed herein may estimate the background luminance that a user of a device perceives using various techniques. In some implementations, this is achieved by mounting a camera on or in the device that captures images of the field of view of the user. The camera may be calibrated, for example, using its spectral response functions and exposure time, to deliver a luminance value in cd/m² to set the $L_b$ parameter. In some implementations, only luminance is needed and, thus, the camera may be a greyscale camera.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   identifying first luminance values corresponding to pixels of an image, wherein the first luminance values result in human perception of relative lightness differences amongst the pixels;
   determining second luminance values corresponding to the pixels of the image adjusted for display on an augmented reality device, wherein the second luminance values are determined based on the first luminance values, a non-linear relationship between luminance and perception, and a third luminance associated with a physical environment, wherein the second luminance values are determined so that the second luminance values differ from the first luminance values and result in perception of relative lightness differences amongst the pixels that are the same as the perception of relative light differences amongst the pixels resulting from the first luminance values; and displaying the image using the second luminance values on the augmented reality device, wherein the augmented reality device is configured to provide a view comprising the image and the physical environment.

2. The method of claim 1, wherein determining the second luminance values comprises:

determining first perceptual values based on the first luminance values and the non-linear relationship between luminance and perception;

generating second perceptual values corresponding to the pixels of the image by adjusting the first perceptual values based on a characteristic of the physical environment; and determining the second luminance values based on the second perceptual values and the non-linear relationship between luminance and perception.

3. The method of claim 2, wherein the perceptual values are lightness values corresponding to differences in perceived light intensity contrast.

4. The method of claim 2, wherein the second perceptual values are generated by adjusting the first perceptual values to account for a background luminance of the physical environment.

5. The method of claim 2, wherein the second perceptual values are generated by increasing each of the first perceptual values by adding a value corresponding to a background luminance of the physical environment.

6. he method of claim 1, wherein the first luminance values are pixel-specific luminance values of an image intended for display without background luminance.

7. The method of claim 1, wherein the non-linear relationship corresponds to a non-linear luminance-to-lightness curve.

8. The method of claim 1, wherein the third luminance is a background luminance.

9. The method of claim 1, wherein the image is displayed in front of a view of the physical environment on the augmented reality device.

10. The method of claim 1, wherein the augmented reality device is a head-mounted device (HMD).

11. The method of claim 1, wherein a view of the augmented reality device comprises an optical see-through view.

12. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause thea system to perform operations comprising:

identifying first luminance values corresponding to pixels of an image, wherein the first luminance values result in human perception of relative lightness differences amongst the pixels;

determining second luminance values corresponding to the pixels of the image adjusted for display on an augmented reality device, wherein the second luminance values are determined based on the first luminance values, a non-linear relationship between luminance and perception, and a third luminance associated with a physical environment, wherein the second luminance values are determined so that the second luminance values differ from the first luminance values and result in perception of relative lightness differences amongst the pixels that are the same as the perception of relative light differences amongst the pixels resulting from the first luminance values; and displaying the image using the second luminance values on the augmented reality device, wherein the augmented reality device is configured to provide a view comprising the image and the physical environment.

13. The device of claim 12, wherein determining the second luminance values comprises:

determining first perceptual values based on the first luminance values and the non-linear relationship between luminance and perception;

generating second perceptual values corresponding to the pixels of the image by adjusting the first perceptual values based on a characteristic of the physical environment; and determining the second luminance values based on the second perceptual values and the non-linear relationship between luminance and perception.

14. The device of claim 13, wherein the perceptual values are lightness values corresponding to differences in perceived light intensity contrast.

15. The device of claim 13, wherein the second perceptual values are generated by adjusting the first perceptual values to account for a background luminance of the physical environment.

16. The device of claim 13, wherein the second perceptual values are generated by increasing each of the first perceptual values by adding a value corresponding to a background luminance of the physical environment.

17. The device of claim 12, wherein the non-linear relationship corresponds to a non-linear luminance-to-lightness curve.

18. The device of claim 12, wherein the augmented reality device is a head-mounted device (HMD).

19. A non-transitory computer-readable storage medium, storing program instructions computer-executable on a computer to perform operations comprising:

identifying first luminance values corresponding to pixels of an image, wherein the first luminance values result in human perception of relative lightness differences amongst the pixels;

determining second luminance values corresponding to the pixels of the image adjusted for display on an augmented reality device, wherein the second luminance values are determined based on the first luminance values, a non-linear relationship between luminance and perception, and a third luminance associated with a physical environment, wherein the second luminance values are determined so that the second luminance values differ from the first luminance values and result in perception of relative lightness differences amongst the pixels that are the same as the perception of relative light differences amongst the pixels resulting from the first luminance values; and displaying the image using the second luminance values on the augmented reality device, wherein the augmented reality device is configured to provide a view comprising the image and the physical environment.

20. The non-transitory computer-readable storage medium of claim 19, wherein determining the second luminance values comprises:
   determining first perceptual values based on the first luminance values and the non-linear relationship between luminance and perception;
   generating second perceptual values corresponding to the pixels of the image by adjusting the first perceptual values based on a characteristic of the physical environment; and
   determining the second luminance values based on the second perceptual values and the non-linear relationship between luminance and perception.

* * * * *

UNITED STATES PATENT AND TRADEMARK OFFICE
CERTIFICATE OF CORRECTION

PATENT NO. : 11,238,662 B2  
APPLICATION NO. : 17/018059  
DATED : February 1, 2022  
INVENTOR(S) : Ralf Habel and Anselm Grundhoefer Page 1 of 1

It is certified that error appears in the above-identified patent and that said Letters Patent is hereby corrected as shown below:

In the Claims

Claim 6, Column 17, Line 38 reads:  
"6. he method of claim 1, wherein the first luminance"  
Should read:  
--6. The method of claim 1, wherein the first luminance--

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*